Oct. 29, 1957 B. E. GETZ 2,811,003
HAY PROCESSING MACHINE
Filed Dec. 30, 1952 6 Sheets-Sheet 1

INVENTOR.
BENJAMIN E. GETZ
BY
ATTORNEY

Oct. 29, 1957   B. E. GETZ   2,811,003
HAY PROCESSING MACHINE
Filed Dec. 30, 1952   6 Sheets-Sheet 4

INVENTOR.
BENJAMIN E. GETZ
BY
ATTORNEY

Oct. 29, 1957 B. E. GETZ 2,811,003
HAY PROCESSING MACHINE
Filed Dec. 30, 1952 6 Sheets-Sheet 5
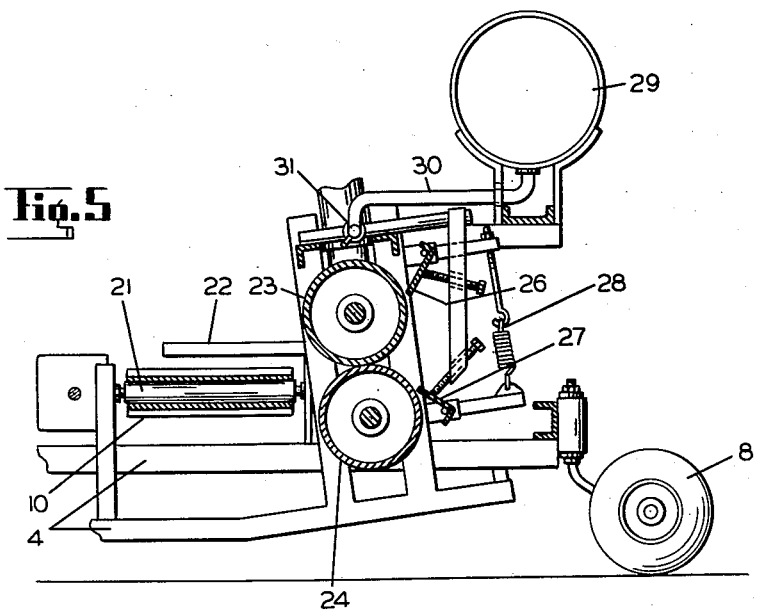
INVENTOR.
BENJAMIN E. GETZ
BY
ATTORNEY Oct. 29, 1957  B. E. GETZ  2,811,003
HAY PROCESSING MACHINE
Filed Dec. 30, 1952  6 Sheets-Sheet 6

INVENTOR.
BENJAMIN E. GETZ
BY
ATTORNEY

United States Patent Office 2,811,003
Patented Oct. 29, 1957

2,811,003

HAY PROCESSING MACHINE

Benjamin E. Getz, Morton, Ill., assignor to A. F. Meyer Mfg. Co., Morton, Ill., a corporation of Illinois Application December 30, 1952, Serial No. 328,736

7 Claims. (Cl. 56—1)

This invention relates to improvements in means for processing hay and the like, and more particularly to apparatus for use in connection with the cutting and processing of hay and similar agricultural products that are customarily mowed and dried before removal from the field, the invention being designed to cut, crush, and ted the crop so as to hasten the drying period, although the invention may have other uses and purposes as will be apparent to one skilled in the art.

The instant invention relates to improvements on the inventions set forth in my previous patents "Agricultural Cutting and Processing Machine Assembly" No. 2,592,269 and "Method of Processing Hay and the Like" No. 2,592,270, both issued April 8, 1952.

As pointed out more fully in my aforesaid patents, it is, of course, desirable to deposit the hay or other crop after crushing immediately behind the processing machine and directly behind the tractor or other power vehicle; i. e. in the swath being traveled by the power vehicle or tractor and behind the same, so that after the crop is distributed on the ground, the tractor does not run over the same. In the aforesaid patents, the arrangement was such that if a mower were used, one swath was mowed while the just previously mowed swath was being processed. However, in some cases, it may be more desirable to process the hay substantially immediately upon cutting, and not leave the cut hay upon the ground before processing until the apparatus circles the field or until the next swath is cut.

With that in mind, it is an important object of the instant invention to provide mechanism for processing hay and the like which crushes the hay substantially immediately after it is mowed, but distributes that hay in a loose fluffy condition on the ground in the next adjacent swath behind the processing machine and the power vehicle pulling the same.

Also an object of the invention is the provision of hay processing apparatus which picks up the hay immediately after it is cut, processes the same, and transfers the processed hay to the next previously cut swath and deposits it therein in a loose fluffy condition behind the processing machine and the power vehicle drawing the same.

It is also an object of the invention to provide a processing mechanism which picks up hay from the swath in which it was cut, continuously transfers it laterally over the next previously cut swath, processes the hay, and discharges it in that next previously cut swath behind the processing machine and the power vehicle drawing the same.

Another feature of the invention is the provision of hay processing mechanism which automatically and continuously mows a swath of hay or the like, immediately picks up the mowed crop, transfers the crop to a position over the next previously mowed swath, processes the crop either before or after the transfer is made, and deposits the crop in the next previously mowed swath behind the mechanism.

Previous experience has indicated that in the morning and late afternoon or early evening, hay and similar crops are somewhat moist because of dew and dampness in the air. Certain university tests have indicated that hay and other grasses have a higher sugar and starch content in the middle or dry period of the day than in the morning and early evening. If pure hay as such were alone present in the field, apparently no difficulty would be experienced in using a processing machine embodying crushing rolls, but the fact is that it is impossible to avoid the presence of certain grasses such as blue grass, Johnson grass, orchard grass, etc., and during the dry portion or middle of the day, such grasses frequently cause difficulty. Due to the drier condition of the crop in the middle of the day, the rolls sometime become sticky and if a grass blade enters between the rolls and sticks thereto, in a relatively short interval other grass blades are so stuck to the rolls, and the crop may not be properly crushed by virtue of such accumulation, and in addition there would be frequent discharges of bunches or clumps of the crop which obviously would not properly dry or cure for a considerable length of time, instead of the even fluffy properly tedded processed hay that results in the early morning and later afternoon periods when stickiness does not occur.

Accordingly, it is also an object of this invention to provide a hay processing mechanism including crushing rolls equipped with means actuable at the will of the operator to moisten the crushing rolls and avoid stickiness.

Another object of the invention resides in the provision of hay processing apparatus embodying crushing rolls, with a liquid container arranged to selectively discharge a relatively small amount of liquid on the crushing rolls during the dry period of the day. At this point, it may be best to explain that the amount of moisture discharged on the rolls is relatively insignificant compared with the amount of crop passing between the rolls, so that the added liquid does not prolong the drying period of the crop.

More specifically it is an object of the invention to provide processing mechanism for hay and similar crop, which mechanism embodies crushing rolls and is provided with a tank to selectively discharge a predetermined amount of liquid on the crushing rolls at the will of the operator.

In some instances, crops may not be sufficiently crushed, or crushed to a desirable extent, in one pass through a pair of rolls.

With that thought in mind, it is also an important object of this invention to provide a machine for processing hay and the like, which machine is so constructed that it insures complete and satisfactory crushing of any hay-like crop at all times.

A further object of the invention resides in the provision of a machine for processing hay or the like, embodying a plurality of sets of crushing rolls with means to insure proper movement of the hay from one set of rolls to the other without contacting the ground.

Still another feature of the invention resides in the provision of a machine for processing hay or the like, embodying at least a double set of crushing rolls, and wherein at least one set of rolls is selectively adjustable as to the amount of pressure therebetween.

It is also an object of the invention to provide a new and novel method of processing hay and similar crops.

While some of the more salient features, characteristics and advantages of the instant invention have been above pointed out, others will become apparent from the following disclosures, taken in conjunction with the accompanying drawings, in which—

Figure 5 is an enlarged fragmentary vertical sectional view taken substantially as indicated by the line 5—5 of Fig. 2, looking in the direction of the arrows;

Figure 6 is an enlarged fragmentary vertical sectional view taken substantially as indicated by the staggered line 6—6 of Fig. 3;

As shown on the drawings:

Referring to Figs. 1, 2, 3, 4, or any of them, it will be seen that each embodiment of the instant invention is shown operatively connected to a power vehicle such as a tractor generally indicated by numeral 1. The tractor is provided with the usual draw-bar arrangement 2 and a power take off visually exemplified by telescopic shaft and universal joint assembly 3.

Figure 1:
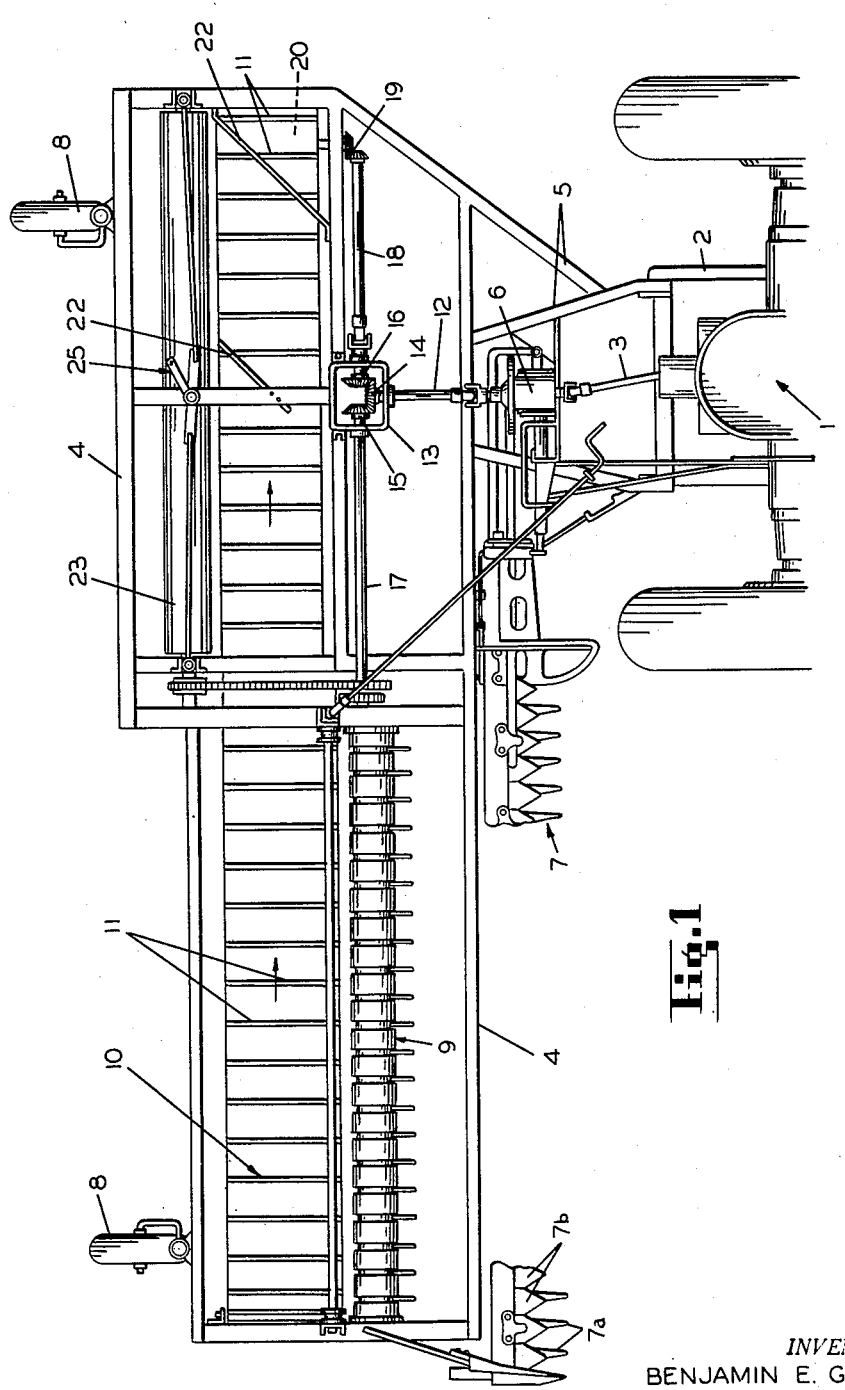
Figure 1 is a fragmentary plan view of hay processing mechanism embodying principles of the instant invention, showing the same operatively connected to a tractor or power vehicle.

The processing machine, referring now particularly to Fig. 1, includes a frame 4 which is of relatively great width, so that it substantially covers two adjacent swaths in a field. This frame has a draw-bar arrangement 5 projecting forwardly therefrom at one side of the frame, which draw-bar arrangement may be connected, pivotally or otherwise, to the draw-bar 2 of the tractor. The draw-bar arrangement 5 is preferably centrally disposed with respect to substantially half the frame 4 so that the half frame portion carrying the draw-bar arrangement will be directly behind the tractor during operation. A suitable gear box or transmission 6 is carried by the draw-bar assembly 5 and is connected to the shaft 3 leading from the power take off of the tractor in the usual manner.

A cutter bar assembly generally indicated by numeral 7, driven from the gear box 6, may be associated with the processing machine, and the operative portion of this cutter bar extends over the half of the machine projecting to one side of the tractor. The cutter bar includes the usual guard elements 7a and reciprocating knife blades 7b. The cutter bar is of known construction, and may be raised and lowered at will by mechanism not shown in detail but of any suitable type known to the art.

As to the processing machine proper, the aforesaid frame 4 is fabricated from angle and channel bars, and is rendered mobile by the attachment of wheels 8—8, preferably to the rear part of the frame, and in the illustrated instance these wheels are shown as caster wheels projecting rearwardly of the frame. The frame gets its entire support from the wheels 8—8, and the connection of the draw-bar assembly 5 with the tractor.

Journaled in the projecting half of the frame, that is the part that projects to one side of the tractor, is a rotary pickup element to elevate mowed hay or crop from the ground. This pickup element is of the same construction set forth in George Innes U. S. Letters Patent No. 2,133,143, issued October 11, 1938. The rotary pickup 9 deposits the mowed crop on a transfer element generally indicated by numeral 10 which is in the form of an endless conveyor operating transversely of the frame, and comprising judiciously spaced bars 11. The conveyor 10 moves the crop from the pickup side of the frame to that portion of the frame following immediately behind the tractor, or in effect transfers the mowed crop from the swath in which it was cut to the next adjacent or next previously mowed swath through which the tractor travels.

Figure 8:
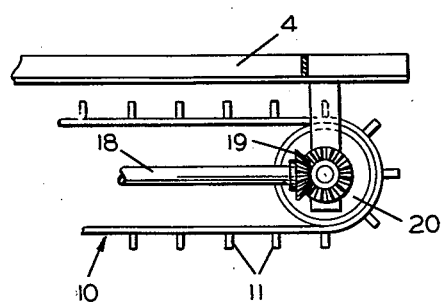
Figure 8 is an enlarged fragmentary vertical sectional view taken substantially as indicated by the line 8—8 of Fig. 2, illustrating the conveyor drive.

The drive for the rotary pickup 9 as well as the conveyor 10 is by way of a shaft and universal joint connection 12 with the gear box 6, which shaft extends through another gear box 13 and terminates in a bevel gear 14 which simultaneously operates a pair of oppositely disposed bevel gears 15 and 16. The gear 15 is connected through shafting 17 to the rotary pickup 9, while the gear 16 is connected through shafting 18 to a bevel gear assembly 19 of which one gear is connected to a conveyor pulley roller 20. The conveyor drive connection is thus seen in Fig. 8, that particular drive connection being substantially the same in all embodiments of the instant invention. At the opposite end thereof, the conveyor is trained around a free running or idler roll 21, seen clearly in Fig. 5.

In order to deflect or move the crop off the conveyor 10, a plurality of deflectors 22 may be fixedly mounted on the frame 4. As seen clearly in Fig. 1, these deflectors extend obliquely over the conveyor, and are graduated in size so that they extend over the conveyor an increasing distance in the direction of motion of the conveyor, and thereby the crop carried by the conveyor is evenly deflected from the conveyor toward the rear of the machine.

The deflectors, with reference now to Fig. 5, guide the crop between a pair of superposed crushing rolls 23 and 24 which operate in the manner of well known wringer rolls, to squeeze and crush the crop between them. The pressure between the rolls may be selectively varied by the operator by means of a lever arrangement generally indicated by numeral 25 in Fig. 1 and more fully disclosed and described in my aforesaid patents. Referring again to Fig. 5 it will be seen that scraper blades 26 and 27 act against the rolls 23 and 24 respectively to insure that the rolls remain in a clean condition and all of the crop passing through the rolls is deposited upon the ground. These scraper blades are preferably spring biased toward the rolls by a spring and lever assemblage generally indicated by numeral 28, and more fully disclosed and described in my aforesaid patents.

Now with the machine just above described, it will be noted that all wheels, both of the tractor and the processing machine, will ride over clean ground or in what may be referred to as naked swaths. Not any wheel traverses the crop either before it is cut or after it is processed. When starting a field the first swath may have to be sacrificed to some extent, but thereafter the tractor proceeds along a swath devoid of any crop, and the standing crop in the adjacent swath is cut, immediately picked up, and the wheels of the processing machine traverse the naked swath. Not any of the crop, therefore, is run over by the vehicle and objectionably compacted or pressed closely to the earth either before or after cutting.

It will readily be seen that as the tractor and the processing machine move down the field, one swath of standing crop is cut, the cut crop is immediately picked up, transferred to the opposite side of the machine over the next adjacent and naked swath, processed by passing between the crushing rolls at that side of the machine, and distributed in a loose fluffy condition on the ground for drying. The wheel 8 from the tractor side of the machine is relatively small, carries a relatively light load, and should it pass over any of the processed crop, it would cause little if any damage. However, it would be a simple expedient, if so desired, to move that wheel to the outer edge of the frame where it should not pass over the processed crop. It will also be especially noted that where the cutter bar assembly 7 is utilized on the processing machine, the mowed crop does not lie in the field any material interval of time, but is processed immediately.

Figure 2:
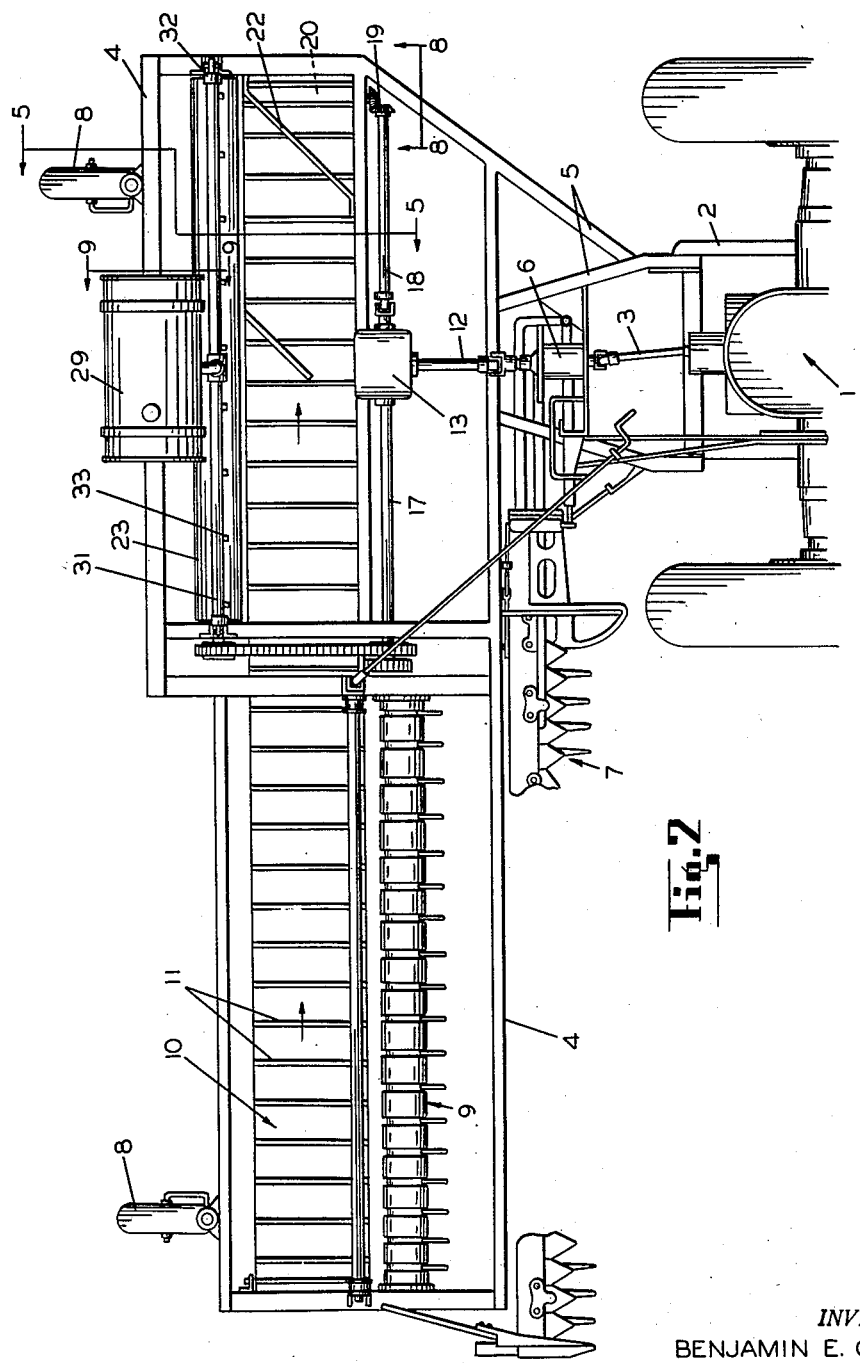
Figure 2 is a view similar in character to Fig. 1, but illustrating the processing mechanism equipped with means to selectively provide added moisture to the crushing rolls.
Figure 9:
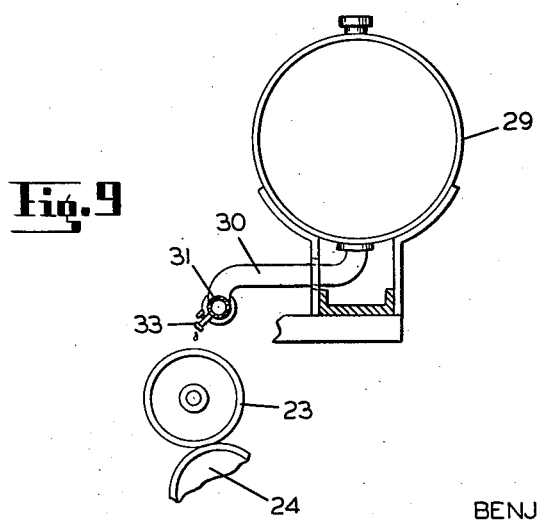
Figure 9 is an enlarged fragmentary vertical sectional view taken substantially as indicated by line 9—9 of Fig. 2, illustrating the means for artificially moistening the crushing rolls.

As pointed out above, in mid-day or the dry part of the day there is danger of unsatisfactory operation owing to stickiness of the rolls by virtue of the fact that the crop does not have a surface moisture content. In Figs. 2, 5 and 9 I have illustrated a structure that simplifies the operation and eliminates this danger very effectively. To this end means are provided to selectively moisten the rolls both as to time and amount, and thus eliminate crops and particularly grasses from adhering to the rolls and becoming wedged between the rolls and the scrapers 26 and 27.

The processing machine illustrated in these figures is of the same construction as that shown in Fig. 1, but has the moistening means added. These means include a liquid container or tank 29 suitably mounted on the frame, preferably to the rear of the rolls. A flexible hose 30 leads from the bottom of the tank to a fixed pipe 31 closed at each end as indicated at 32, and which pipe extends transversely of the machine above the rolls 23 and 24. This pipe is provided with a series of pet cocks 33 spaced therealong, which pet cocks may be individually manually controlled as illustrated, or they could be collectively manually controlled, if so desired. Seven or eight such pet cocks uniformly spaced along the pipe 31 have proven satisfactory.

Each pet cock 33 will discharge liquid from the tank directly upon the upper roll 23. The liquid utilized may be plain water. During operation, whenever it appears as though the crop or grasses contained therein have become too dry for satisfactory operation, it is a simple expedient for the operator to open the pet cocks and permit the liquid from the tank to dribble upon the upper roll. The quantity of liquid necessary in order to satisfactorily and effectively moisten the rolls to eliminate stickiness is negligible or insignificant in comparison with the amount of crop passing between the rolls, and the amount of liquid utilized for moistening the rolls does not add to the drying time of the processed crop to any noticeable degree. With this arrangement, therefore, adequate and proper processing of a crop may continue throughout the entire day.

It should be understood that the moistening equipment may be utilized on all illustrated embodiments of the invention, but has not been illustrated thereon for purposes of clarity in the showings.

Figure 3:
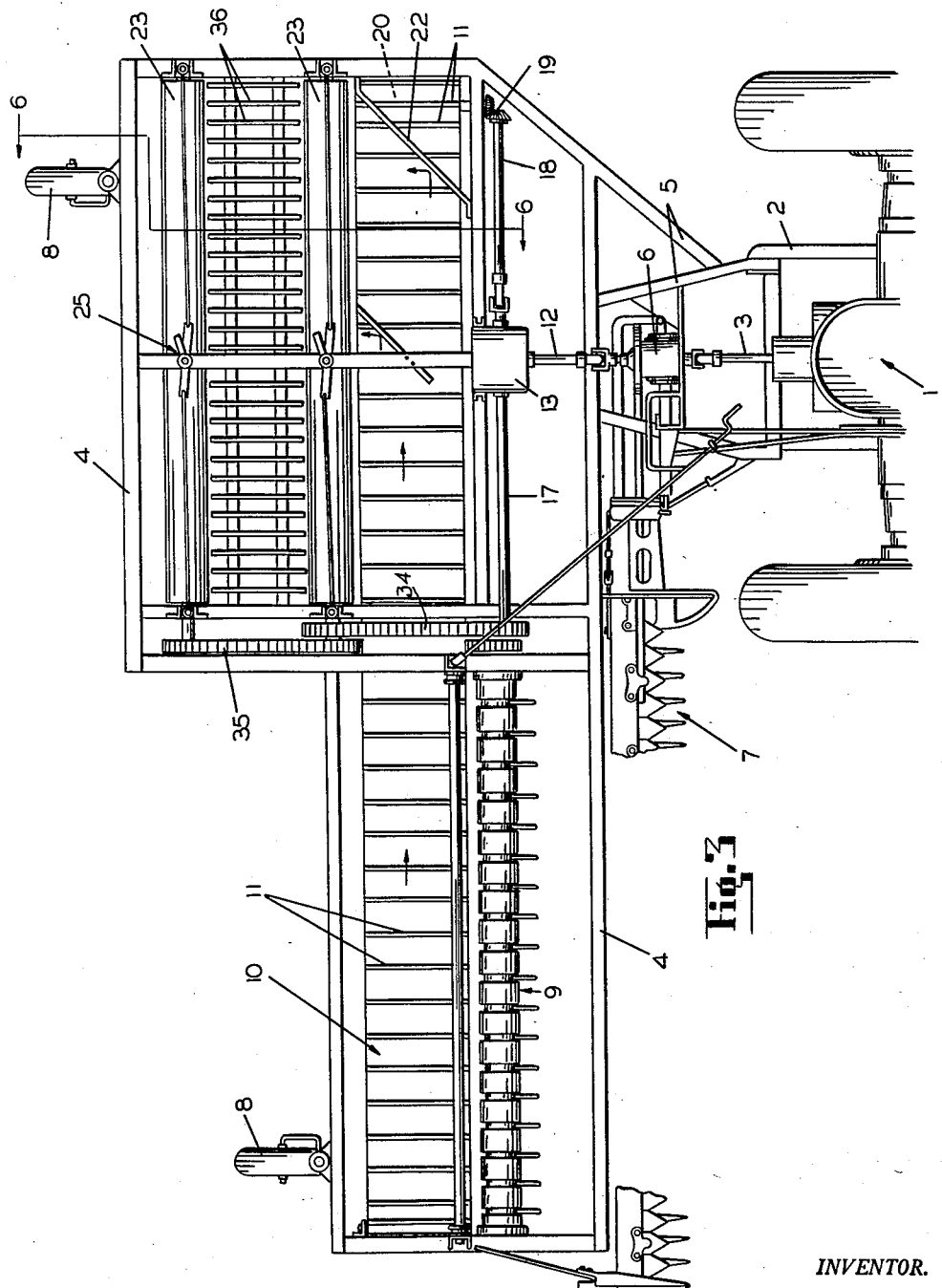
Figure 3 is a fragmentary plan view of the same character as Figs. 1 and 2, but illustrating the machine equipped with a second set of crushing rolls.

In some instances, as previously explained, satisfactory crushing of the crop may not be provided by one pass through the crushing rolls. With certain crops, it may be desirable to have at least a second pass through crushing rolls before the crop is distributed upon the ground for drying. To this end, I have illustrated in Figs. 3 and 6 an arrangement for accomplishing a plurality of crushings of the crop. The general arrangement of the processing machine is the same as that previously described in connection with Fig. 1, but the frame has been rearwardly extended in the tractor following half portion thereof to accommodate another pair of crushing rolls 23a and 24a, as seen clearly in Figs. 3 and 6. The first set of rolls 23 and 24 may be suitably driven by a chain or sprocket arrangement 34 from the shaft 17, while a second set of rolls may be driven by a similar chain and sprocket arrangement 35 functioning as a semi-continuation of the drive 34. As seen in Fig. 3, both sets of rolls are preferably provided with pressure adjusting means 25, so that these sets of rolls may operate under different pressures, if so desired.

After leaving the first set of rolls 23—24, the crop passes over what may be termed for convenience a stationary rake 36, comprising a plurality of spaced bars fixedly mounted between the sets of rolls. As seen clearly in Fig. 6, the end portions of the bars are upturned as at 37—37 to insure receiving the crop satisfactorily from the first set of rolls, and causing proper delivery of that crop between the second set of rolls. The force with which the crop is discharged from between the crushing rolls 23 and 24 is sufficient to carry the crop across the stationary rake 36, and cause it to feed properly between the rolls 23a and 24a.

Figure 4:
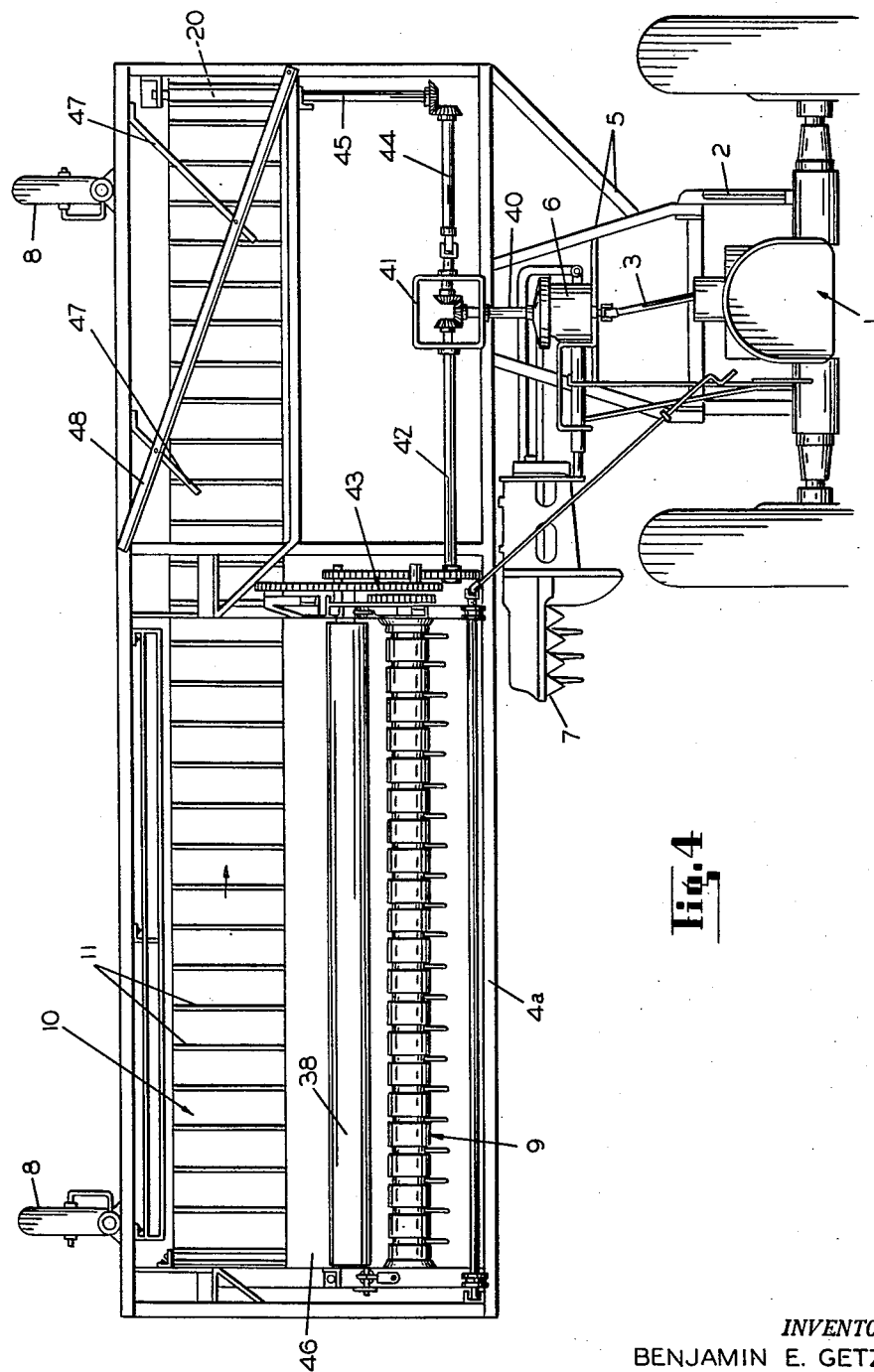
Figure 4 is a fragmentary plan view of a hay processing machine of somewhat different construction, showing the same operatively connected to a drawing vehicle.
Figure 7:
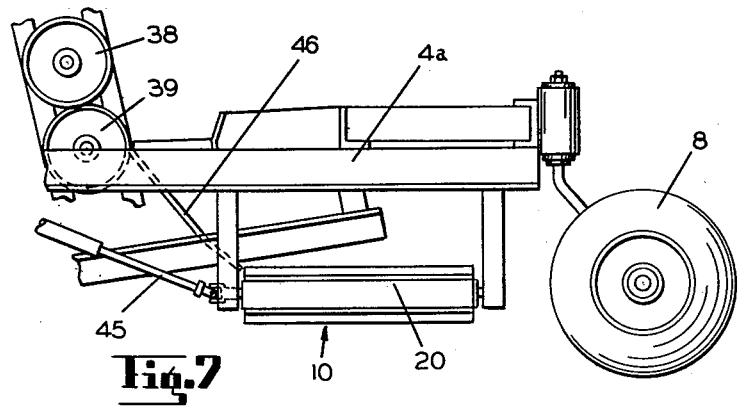
Figure 7 is an enlarged fragmentary side elevational view, with parts removed, taken from the right hand side of Fig. 4.

In Figs. 4 and 7 I have illustrated a somewhat different form of construction, wherein the crushing rolls are carried by the extended portion of the frame, or that portion disposed to one side of the swath traversed by the tractor and into which swath the processed crop is discharged for drying. This structure embodies the same draw-bar arrangement 5 for connection with the tractor, the same gear box arrangement 6, the same cutter bar 7, and behind that arrangement a frame 4a of slightly different configuration than the frame 4, although it performs the same function. The same rotary pickup element 9 is utilized to elevate the mowed crop, but in this instance a pair of crushing rolls 38 and 39 are disposed immediately behind the rotary pickup 9 so that it discharges the mowed crop directly between the rolls. This arrangement necessitates a variation in the drive mechanism, and to this end a shaft 40 couples the gear box 6 with a gear box 41 in the same manner as the shaft and universal joint construction 12 couples the gear box 6 with the gear box 13 in Figs. 1, 2 and 3. From one side of the gear box 41 a shaft 42 extends to become associated with a chain and sprocket wheel train generally indicated by numeral 43, which arrangement drives both the rotary pickup 9 and the crushing rolls 38 and 39. From the opposite side of the gear box 41 a shaft 44 extends to drive a downwardly sloping shaft 45 which connects with the drive roller 20 of the conveyor 10. In this instance, however, the conveyor 10 is disposed on a lower level than in the previous embodiments, as exemplified from the showing in Fig. 7.

Behind the crushing rolls 38 and 39 is a downwardly sloping guide plate 46 which causes proper delivery of the crop from the rolls to the conveyor. The crop is caused to leave the conveyor by means of spaced deflectors 47—47, graduated in size, and depending from an overhead support 48 on the part of the processing machine following the tractor.

The operation of this form of the invention is generally similar to that of the above described embodiments, but the crop is crushed immediately after it is picked up, and then transferred by the conveyor to the opposite side of the machine for distribution on the ground for drying.

From the foregoing, it is apparent that I have provided a processing machine for hay and similar crop which may be propelled by means of a tractor or other power vehicle and which is so arranged that the crop is substantially immediately processed after mowing and is distributed upon the ground for drying in such position that neither vehicle passes over it. Further, it will be noted that the crop is satisfactorily processed whether or not it needs more than one crushing operation, and the processing may continue throughout the entire day without danger of unsatisfactory processing owing to the crushing rolls becoming sticky. The entire mechanism is simple in construction, easily handled, durable, and may be economically manufactured.

It is believed that my novel method of processing hay and similar crop is sufficiently apparent from the foregoing as to warrant no further description herein.

It will be understood that modifications and variations may be effected without departing from the scope of the novel concepts of the present invention.

I claim as my invention:

1. In an agricultural processing machine to act on mowed hay and similar crops, a mobile frame of a width approximating two adjacent swaths with a first side positioned over one swath and a second side positioned over the other swath, pickup means for a mowed crop on the first side of said frame in position to act on the mowed crop in the first swath, conveying means on the frame moving transversely to the direction of travel of the machine to transfer the pick-up crop to the second side of the frame, crushing rolls mounted on said second side to crush the crop delivered by said conveying means and drop it on the ground in the second swath, said crushing rolls extending transversely of the machine and of a length approximately the width of a swath, means on the frame ahead of the rolls to spread the conveyed crop along the crushing rolls to insure an even distribution of the crop over the ground, and draw-bar means projecting forwardly and located substantially in the center of the second side of the frame for connection with a power vehicle draw-bar whereby the power vehicle will not pass over the cut swath on the first side of the machine.

2. In an agricultural processing machine to act on mowed hay and similar crops, a mobile frame, pickup means carried by said frame to elevate a mowed crop as the frame moves along, crushing rolls carried by said frame in receiving relationship to the pickup means to crush the elevated crop and redistribute it upon the ground for drying, and liquid distributing means positioned to distribute moisture on one of said rolls ahead of the location where the crop enters between the rolls with an amount of moisture being transferred to the other roll by contact whereby a strata of moisture is created between the rolls and the crop preventing the crop from adhering to the rolls.

3. In an agricultural processing machine to act on mowed hay and similar crops, a mobile frame, pickup means carried by said frame to elevate a mowed crop as the frame moves along, crushing rolls carried by said frame in receiving relationship to the pickup means to crush the elevated crop and redistribute it upon the ground for drying, a liquid container on said frame, and distributing means leading from said container over said crushing rolls positioned to distribute moisture on one of said rolls ahead of the location where the crop enters between the rolls with an amount of moisture being transferred to the other roll by contact whereby a layer of moisture is created between the rolls and the crop is prevented from adhering to the rolls.

4. In an agricultural processing machine to act on mowed hay and similar crops, a mobile frame, pickup means carried by said frame to elevate a mowed crop as the frame moves along, crushing rolls carried by said frame in receiving relationship to the pickup means to crush the elevated crop and redistribute it upon the ground for drying, a liquid container on said frame, a pipe connected to said container and extending over said rolls positioned ahead of the location where the crop enters the rolls, and a plurality of manually controlled taps on said pipe to selectively provide moisture on said rolls and create a layer of moisture between the rolls and the crop to prevent the crops from adhering to the rolls.

5. In an agricultural processing machine to act on mowed hay and similar crops, a mobile frame having a first and second side which together present a width approximating two swaths, crop pickup means mounted on the first side of said frame to gather mowed crop in one swath, conveyor means on the frame operating transversely of the machine to receive the crop from the pickup means and transfer it to the second side of the machine over the next adjacent swath, crushing rolls on said second side of the machine positioned to receive crop therebetween from said conveying means, said crushing rolls extending widthwise of the machine and of a length approximating the width of a swath, and means on the frame ahead of the rolls to spread the conveyed crop along the crushing rolls to insure an even distribution of the crop over the ground, said rolls depositing the crop passing therethrough evenly over the swath behind the rolls for drying.

6. In an agricultural processing machine to act on mowed hay and similar crops, a mobile frame having a first and second side together having a width approximating two swaths, crop pickup means on the first side of said frame to gather mowed crop in one swath, conveyor means on the frame operating transversely of the machine to receive the crop from the pickup means and transfer it to the second side of the machine over the next adjacent swath, crushing rolls on said second side of the machine positioned to receive crop therebetween from said conveying means, said crushing rolls extending widthwise of the machine and of a length approximating the width of a swath, said rolls depositing the crop passing therethrough evenly over the swath behind the rolls for drying, and guide means extending over said conveying means adjacent said rolls and spreading the crop over the rolls to insure even distribution of the crop to said rolls from the conveying means.

7. In an agricultural processing machine to act on mowed hay and similar crops, a mobile frame having a first and second side and of a width approximating two swaths, crop pickup means on the first side of said frame to gather mowed crop in one swath, conveyor means on the frame operating transversely of the machine to receive the crop from the pickup means and transfer it to the second side of the machine over the next adjacent swath, crushing rolls on said other side of the machine positioned to receive crop therebetween from said conveying means, means on the frame ahead of the rolls to spread the conveyed crop along the crushing rolls to insure even distribution of the crop over the ground, said crushing rolls extending widthwise of the machine and of a length approximating the width of a swath, said rolls depositing the crop passing therethrough evenly over the swath behind the rolls for drying, and said means to spread conveyed crop including spaced angled guide members of different lengths extending over said conveying means adjacent said rolls to insure even distribution of the crop to the rolls.

References Cited in the file of this patent

UNITED STATES PATENTS

| | | |
|---|---|---|
| 1,490,605 | Faehn | Apr. 15, 1924 |
| 2,294,440 | Barker | Sept. 1, 1942 |
| 2,325,171 | Bernstein | July 27, 1943 |
| 2,379,371 | Moschel et al. | June 26, 1945 |
| 2,447,399 | Dey | Aug. 17, 1948 |
| 2,503,416 | Russell | Apr. 11, 1950 |
| 2,521,999 | Scott | Sept. 12, 1950 |
| 2,529,577 | Schempp et al. | Nov. 14, 1950 |
| 2,592,269 | Getz | Apr. 8, 1952 |
| 2,592,270 | Getz | Apr. 8, 1952 |
| 2,637,156 | Rust | May 5, 1953 |
| 2,664,684 | Russell | Jan. 5, 1954 |
| 2,727,347 | Fenster et al. | Dec. 20, 1955 |